(12) United States Patent
Freuler

(10) Patent No.: US 9,032,580 B2
(45) Date of Patent: May 19, 2015

(54) COUNTERWEIGHT DEVICES AND SYSTEMS FOR PAINTBRUSHES AND OTHER HAND TOOLS

(76) Inventor: Greg Freuler, Portland, OR (US)

( * ) Notice: Subject to any disclaimer, the term of this patent is extended or adjusted under 35 U.S.C. 154(b) by 257 days.

(21) Appl. No.: 13/543,530

(22) Filed: Jul. 6, 2012

(65) Prior Publication Data

US 2013/0061428 A1 Mar. 14, 2013

Related U.S. Application Data

(63) Continuation-in-part of application No. 13/367,329, filed on Feb. 6, 2012.

(60) Provisional application No. 61/573,572, filed on Sep. 8, 2011.

(51) Int. Cl.
*A46B 5/00* (2006.01)
*B25G 1/00* (2006.01)
*B65G 1/00* (2006.01)
*B25G 1/10* (2006.01)

(52) U.S. Cl.
CPC . *B65G 1/00* (2013.01); *Y10T 16/82* (2013.01); *A46B 5/00* (2013.01); *B25G 1/102* (2013.01)

(58) Field of Classification Search
CPC .................................. A46B 5/00; B25G 1/00

USPC ......................................................... 15/143.1
See application file for complete search history.

(56) References Cited

U.S. PATENT DOCUMENTS

| | | | |
|---|---|---|---|
| 6,145,151 A * | 11/2000 | Herron et al. ................. | 15/143.1 |
| 6,742,213 B1 * | 6/2004 | Vaes ............................. | 15/143.1 |
| 8,387,197 B2 * | 3/2013 | Moskovich et al. .......... | 15/143.1 |
| 8,701,684 B2 * | 4/2014 | Muhl et al. .................... | 132/120 |
| 2009/0158541 A1 * | 6/2009 | Vaes ............................. | 15/143.1 |

* cited by examiner

*Primary Examiner* — Randall Chin
(74) *Attorney, Agent, or Firm* — Mohr Intellectual Property Law Solutions, PC

(57) ABSTRACT

Counterweight devices and systems for a hand tool, such as a paintbrush, having a forward working end and a handle extending rearwardly along a longitudinal axis, having a distal end, with the hand tool having a center of gravity located on the axis forward of the midpoint between the working and distal ends, are disclosed. A counterweight device includes a counterweight body configured to be mounted to a portion of the handle, and one or more counterweights supported on the counterweight body. The counterweight device is thereby adapted to shift the center of gravity of the hand tool rearward along the axis of the handle to a predetermined extent when the counterweight body is mounted to the handle. A counterweight system includes a set of interchangeable counterweights each having a different weight and each configured to be removably attached either to the counterweight body or to a counterweight attached thereto.

11 Claims, 7 Drawing Sheets

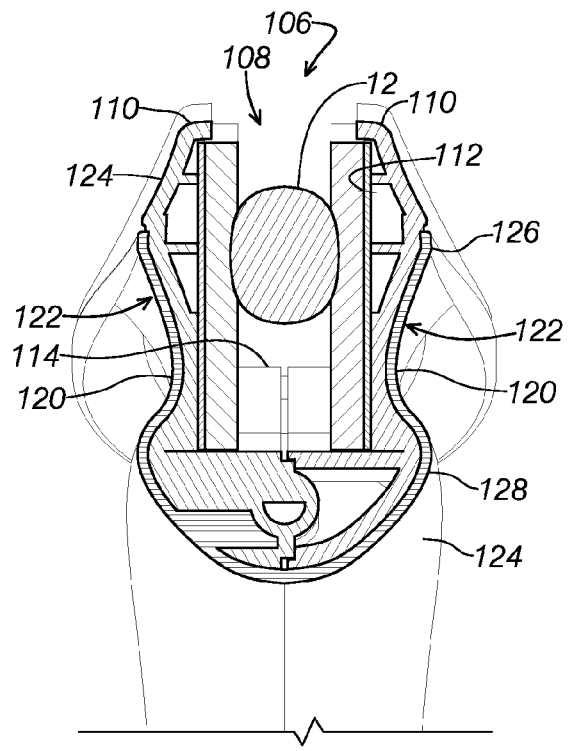
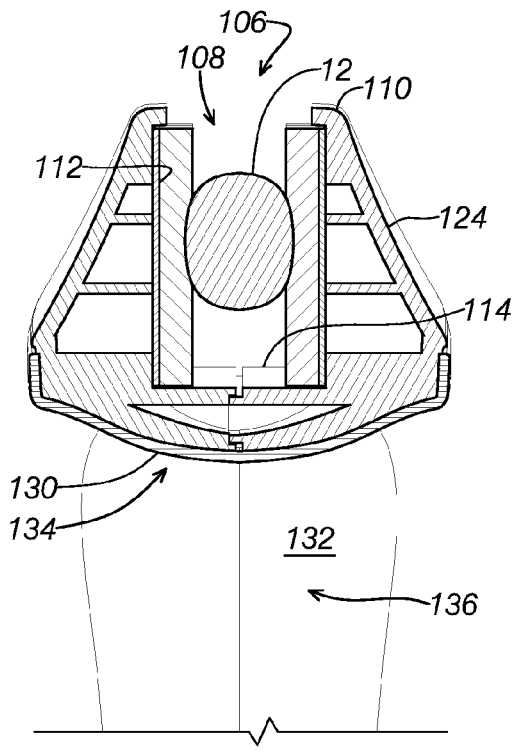
FIG.2　　　　　　FIG.3
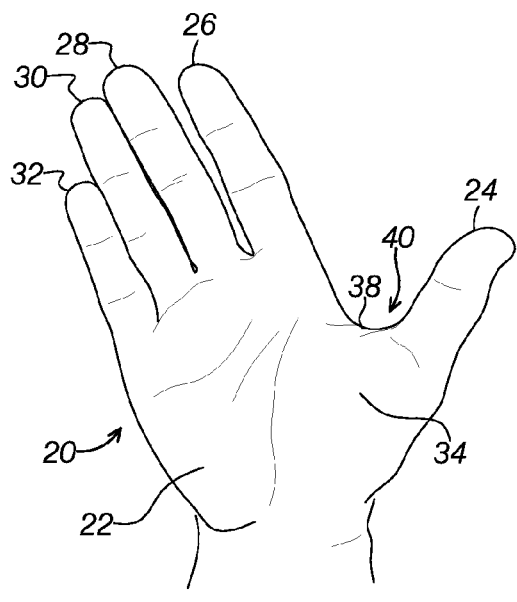
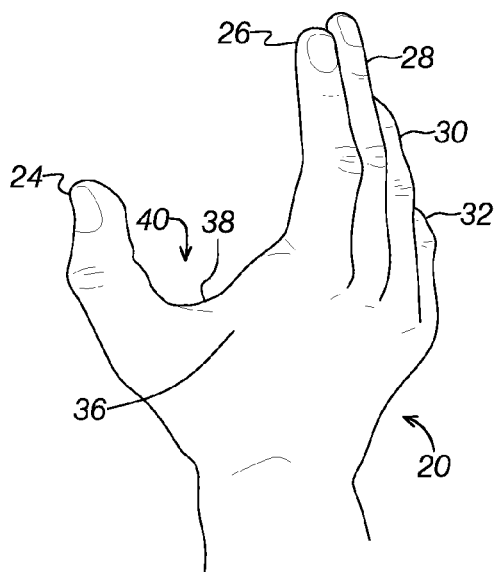
FIG.4　　　　　　FIG.5

COUNTERWEIGHT DEVICES AND SYSTEMS FOR PAINTBRUSHES AND OTHER HAND TOOLS

RELATED APPLICATION

This application claims the benefit as a continuation-in-part of U.S. patent application Ser. No. 13/367,329, filed on Feb. 6, 2012, now pending, which in turn claims the benefit of U.S. Provisional Application No. 61/573,572, filed on Sep. 8, 2011, The entire disclosures of the aforementioned applications are incorporated herein by reference for all purposes.

TECHNICAL FIELD

This disclosure relates to hand tool accessories, and in particular to ergonomic holders and counterweight devices for paintbrushes and other hand tools.

BACKGROUND

Hand tools of a seemingly infinite variety have been developed for many purposes, and are currently used by individuals ranging in skill level from craftsmen with many years of trade experience to untrained persons needing to accomplish simple task around the house. One thing many hand tools have in common, however, is that prolonged use and repeated manipulation of a hand tool, such as a screwdriver, a ratchet, a paintbrush, and so forth, tends to cause user fatigue. This is commonly because the same muscles and joints that are used to manipulate a hand tool, generally those of the user's fingers and/or wrist, also bear the weight of the hand tool. Use of a paintbrush, for example, generally involves not only supporting a wet brush made heavy with paint, but also requires repetitive back-and-forth movement of the user's wrist and/or force applied with the fingers. Also, the orientation at which a tool must be held when used, such as a paintbrush when applying paint to a surface, often requires the user's hand to be at an angle with respect to the user's wrist, further contributing to user discomfort.

SUMMARY

Illustrative embodiments of a ergonomic hand tool holders, and counterweight devices and systems for hand tools, are disclosed. In general, the ergonomic hand tool holders disclosed herein support a hand tool (such as a paintbrush), or a portion thereof (such as a paintbrush handle, or a paintbrush head), for use, while being received comfortably in a user's hand when it is in a natural resting angle with respect to the wrist. To this end, the holders define hand rest areas adapted to engage and rest against the "saddle" of a user's hand (that is, the region of the hand between a user's thumb and forefinger, and the areas surrounding this region on the front amid back of a user's hand), when the holder is held. Accordingly, when the holder is held with the tool in position for use, the weight of the holder and its supported load is distributed to the dorsal saddle area of the user's hand, allowing the user's arm to bear the weight, while the user's wrist and fingers guide, rather than carry, the tool.

In some embodiments, the ergonomic holder includes a body having a tool support portion adapted to support at least a portion of a hand tool, with the working end of the tool oriented generally forward from a forward end region of the body. In such embodiments, the body further includes forefinger and thumb rest areas respectively defined by outwardly-facing, usually concave surfaces of opposing side regions of the body, and a first hand rest area defined by a bottom-facing surface of the body disposed rearward of the side regions. A brace portion extends downwardly from a bottom region of the body and includes a second hand rest area defined by a rearward-facing surface of the brace portion. The first and second hand rest areas, respectively, engage the dorsal and palmar saddle areas of a user's hand when the user holds the holder with the forefinger and thumb engaging the forefinger and thumb rest areas.

In some embodiments, a counterweight device for a paintbrush or hand tool includes a counterweight body configured to be selectively mounted to a portion of the handle of the paintbrush or hand tool, and one or more counterweights supported on the counterweight body. In such embodiments, the counterweight device is adapted to shift the center of gravity rearward along the longitudinal axis of the paintbrush to a predetermined extent when the counterweight body is mounted to the paintbrush handle.

Further, in some embodiments of such a counterweight device, the counterweight body includes a post portion adapted to be received in a corresponding opening formed in the paintbrush handle, such as a hang hole disposed proximate the distal end of the paintbrush handle and/or another opening, such as an opening formed at the distal end of the paintbrush handle and extending longitudinally into the handle, and so forth. In such embodiments, an exterior surface of the post portion may be threaded, ribbed, or otherwise adapted to engage the opening in a friction fit. In such embodiments, a proximal end of the post portion may extend from the opening, and may be adapted to support at least one counterweight thereon.

In other embodiments of such a counterweight device, the counterweight body includes a sleeve portion adapted to receive the distal end of the paintbrush handle therein. In such embodiments, at least one counterweight may be supported inside, and/or on the exterior, of the sleeve portion, such as along the longitudinal axis of the paintbrush handle. In some of such embodiments, the sleeve portion may be adapted to be retained on the paintbrush handle in a friction fit and/or may include interior projections adapted to at least partially nest within a hang hole extending film through the paintbrush handle.

Counterweights for the various counterweight device embodiment disclosed herein may be configured to be detachably supported on the counterweight body. Some embodiments include multiple interchangeable counterweights, for example having different weights, such as to shift the center of gravity of the paintbrush as desired.

Some embodiments of the ergonomic holder include a counterweight device adapted to balance the combined weight of the holder, and a hand tool held thereby, over or near to the dorsal saddle area of a user's hand when the holder is held. In some counterweight embodiments, the weight of the counterweight device is adjustable, such as by being adapted to detachably accept counterweights of varying weight.

In such embodiments, the counterweight may be attached to or integral with the body of a holder, such as by extending rearward from a rearward end region of the body.

The illustrative embodiments disclosed herein are shown and discussed with respect to a paintbrush, as a non-limiting example of a hand tool, for the sake of ease of explanation. However, the principles of construction and operation explained and illustrated herein may be adapted to a wide range of hand tools, including screwdrivers, ratchets, trowels and other surface preparation tools, gardening tools, culinary and kitchen utensils, and so forth, without departing from the spirit and scope of this disclosure, which is intended to encompass such variations.

The concepts, features, methods, and component configurations briefly described above are clarified with reference to the accompanying drawings and detailed description below.

BRIEF DESCRIPTION OF THE DRAWINGS

FIG. 2 shows a cross-sectional view of the embodiment of an ergonomic tool holder of FIG. 1, taken along the line 2-2 of FIG. 1.

FIG. 3 shows another cross-sectional view of the embodiment of an ergonomic tool holder of FIG. 1, taken along the line 3-3 of FIG. 1.

FIG. 4 is an external view of a human right hand from the palmar side.

FIG. 5 is an external view of a human right hand from the dorsal side.

DETAILED DESCRIPTION

Figure 1:
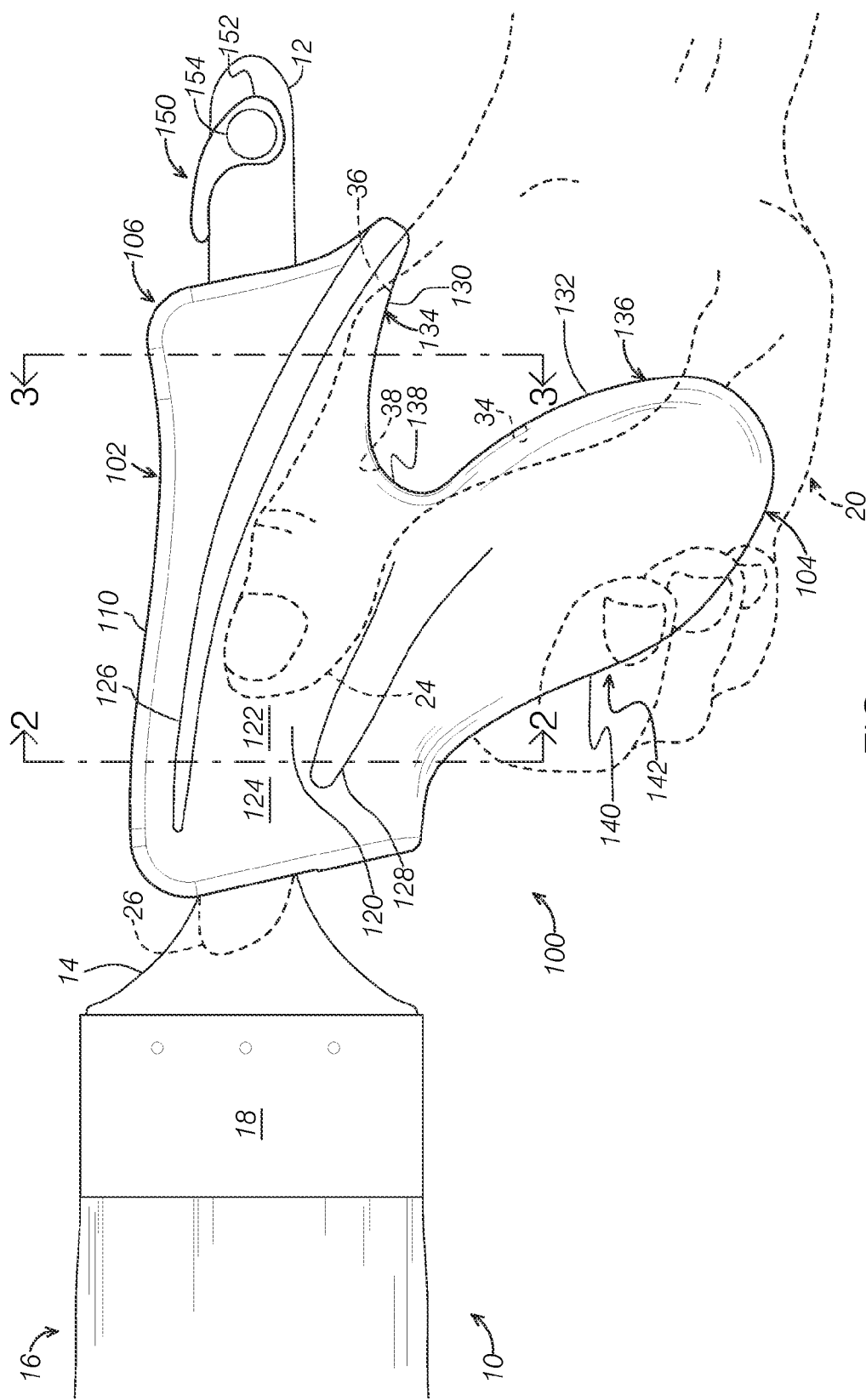
FIG. 1 shows a left side elevation view of a first example embodiment of an ergonomic tool holder constructed in accordance with the present disclosure, supporting a conventional paintbrush. A clip-on counterweight device is shown to be mounted to the handle of the paintbrush. Dashed lines indicate the hand of a user holding the holder.

In this description orientational and directional terms such as "left," "right," "front," "rear," "forward," "rearward," "top," "bottom," and so forth, are used for clarity of illustration and generally refer to the relative positions of components and other objects illustrated in the drawings, but are not intended to be limiting, as the ergonomic tool holders (and components thereof) are not restricted to the orientations and positions shown in the drawings.

FIG. 1 is an elevation view illustrating, at 100, a first example embodiment of an ergonomic tool holder, shown holding a hand tool 10 in the form of a paintbrush. Holder 100 forms a body 102 and a handgrip 104 extending generally downward from a bottom region thereof. In general, holder 100 is fabricated of one or more lightweight and mostly rigid materials such as plastic, carbon fiber, plasticized polymer, and so forth, but some exterior surfaces may include an elastomer over-mold or coating, such as for user comfort, and other components may be formed of materials having other characteristics, as explained herein.

Body 102 of holder 100 includes a tool support portion 106 adapted to receive and support a hand tool, or at least a portion thereof, with the working end of the tool oriented generally forward from a forward end region of the body. For example, tool support portion 106 of holder 100 captures and holds the handle 12 and part of the neck 14 of paintbrush 10, with the head 16 of the paintbrush protruding from the front end of holder 100.

More specifically, and with reference to FIGS. 2 and 3, each of which show a cross-section of the holder 100 along the lines 2-2 and 3-3, respectively, of FIG. 1, the tool support portion 106 of holder 100 is in the form of an open-ended channel 106 defined by a pair of longitudinal walls 108 disposed along the top region of the body 102. Walls 108 are shown to run in parallel from the forward to the rearward end region of the body, and retain the paintbrush handle within the channel by means of a press or friction fit between a pair of flexible foam pads 112 mounted on the interior facing surfaces 110 of walls 108. The foam pad configuration may allow the tool support portion 106 to accommodate brush handles of varying cross-sectional shapes and/or sizes within the channel, and may further allow a user to determine an optimum position within the channel for use (e.g., further up or down in the channel, or forward or rearward or at a slight angle to the horizontal, and so forth, than as shown). Further, the resiliency of the foam pads cushion and allow a limited degree of lateral movement of the handle within the channel, which may increase user comfort as the holder is moved back and forth to utilize the paintbrush held therein.

However, as will become clear from the following description, the tool support portion of an ergonomic tool holder according to the present disclosure may be in any suitable configuration, and located on any desired region of the holder. Further, although the retaining means incorporated in tool support portion 106 is in the form of a pair of flexible foam pads, any manner of retaining device may be used to retain the portion of the tool received by or within the tool support portion. For example, in an embodiment that includes a tool support portion having a channel, such as in holder 100, a brush handle (or other hand tool portion) may be retained therein by means including one or more mechanical clamps to engage the hand tool, springs, locks, straps, magnets, inflatable bladder, snap-in shell, and so forth, as well as combinations thereof.

In embodiments in which a press fit between a pair of walls is used (as shown), different configurations of materials may be used instead of foam pads, such as ribbed, dimpled, or other textured surfaces, which may be formed of the walls themselves or mounted (e.g. detachably or permanently) thereto. Moreover, although the floor 114 of the channel 106 of body 102 is shown to be spaced away from handle 12 of paintbrush 10, other configurations may include a channel floor, or floor portion, configured to engage a portion of the hand tool received in the channel, such as to provide a support and/or retaining means. Alternatively, as noted above, the illustrated configuration may allow the user the option to urge the handle 12 further downward in the channel than as shown, such as to use the floor thereof to brace the handle in a desired position within the channel.

FIG. 1 shows the tool holder 100 held in a user's hand 20. As noted above, the tool holder is ergonomically designed to be received comfortably in a user's hand, as well as to distribute the weight of the holder (and the tool supported thereby) so that the user's arm bears the load, while the user's wrist and fingers guide the movement of the tool. FIGS. 4 and 5 show simplified representations of the surface anatomy of a human right hand 20, with FIG. 4 representing the palm, or the palmar side, and FIG. 5 representing the back, or the dorsal side.

Generally, a user's hand 20 includes a palm 22 to which is connected a thumb 24, a forefinger 26, a middle finger 28, a ring finger 30, and a pinky finger 32. A web of muscles connects the base of the thumb and forefinger, and creates a fleshy pad in the form of a thenar eminence (represented generally at 34) on the thumb side of the palm of a user's hand, and another fleshy pad in the form of a first dorsal interrosseal area (represented generally at 36) on the thumb side of the back of the user's hand. The region of flesh 38 between the thumb and forefinger, as well as the fleshy pads 34, 36 on either side of the user's hand, are collectively referred to herein as the "saddle" of the user's hand, indicated generally at 40. Additionally, the first dorsal interrosseal area 36 is referred to herein as the "dorsal saddle area," and the thenar eminence 34 is referred to herein as the "palmar saddle area," of a user's hand.

With the aforementioned anatomical explanation in mind, the illustrative embodiments of the ergonomic hand tool holders disclosed herein may be thought of as configured to rest the bulk of the holder against the dorsal saddle area of a user's hand, when the user's hand is oriented with the dorsal saddle area upward, with the body and other components of the hand tool holder adapted to receive a user's fingers and/or other hand areas to stabilize the holder in position.

For example, with reference to FIGS. 1-3, body 102 of holder 100 is shown to include forefinger and thumb rest areas 120 respectively defined by outwardly-facing, concave surfaces 122 of opposing side regions of the body 102. More specifically, the concave surfaces 122 are disposed on the exterior facing surfaces 124 of walls 108. Although not required to all embodiments, forefinger and thumb rest areas 120 are shown to be generally symmetric across the longitudinal vertical plane of the holder, such as to allow the holder to be used with either a user's right or left hand, with each rest area 120 contoured to receive a user's thumb or forefinger, as shown in FIG. 1. The surfaces 122 are shown as generally concave, but may be contoured as suitable to provide a natural resting position for the thumb acid forefinger.

Although not required to all embodiments, in the illustrated embodiment, forefinger and thumb rest areas 120 are each further defined by upper and lower ridges 126, 128 that may provide a tactile guide for proper positioning of a user's thumb and forefinger when holding the holder 100. Not only do the forefinger and thumb rest areas 120 allow the small muscles, tendons, and joints of the fingers to relax while the holder is held, but the rest areas are positioned to allow the forward end region of the holder to be moved easily with only slight pressure from the user's forefinger and thumb, to guide the tool supported in the holder during use.

Further, body 102 and handgrip 104 of holder 100 are shaped to interfit with the saddle area 40 of a user's hand, generally by means of first and second hand rest areas 130, 132. More specifically, first hand rest area 130, which is shown to be defined by a bottom-facing, convex surface 134 of body 102 that is disposed rearward of the forefinger and thumb rest areas 120, is adapted to engage and rest against the dorsal saddle area 36 of a user's hand 20 when the holder is held with the user's forefinger 26 and thumb 24 engaging the forefinger and thumb rest areas 120. Additionally, second hand rest area 132 is shown to be defined by a rearward-facing, convex surface 136 of handgrip 104, which is adapted to engage and rest against the palmar saddle area 34 of the user's hand 20 when the holder is so held. Also, although not required to all embodiments, body 102 of holder 100 defines a continuous intermediate surface 138 extending between the first and second hand rest areas 130, 132, which is adapted to engage the region 38 of a user's hand 20 between the forefinger and thumb, when the holder is so held.

Handgrip 104 of holder 100 farther includes a grip area 140 defined by a forward-facing, convex surface 142 of the handgrip, such that the handgrip 104 is adapted to be grasped in a pistol grip, that is, with one or more of the user's middle (28), ring (30), and pinky (32) fingers engaging the grip area 140 when the holder is held as described above.

Like the forefinger and thumb rest areas 120, the various hand- and finger-engaging regions of holder 100 are shown as generally smooth, continuous, and rounded to conform to the hand surface they are adapted to engage. However, one or more of these regions may be stippled, dimpled, ribbed, perforated, or otherwise textured, such as to provide breathability and comfort over prolonged use. Also, as noted above, some or all of these regions may be fabricated from, or coated with, various materials suitable for handgrips, such as soft, resilient elastomers, and so forth. Optionally, such materials may possess a desired amount of "stickiness," or tack, such as to reduce the amount of finger pressure needed to stabilize the holder in the user's hand.

The illustrated handgrip configuration may provide additional stabilization of the holder in a user's hand 20 when held with the forefinger and thumb, such as by allowing one or more of the user's fingers to urge the second hand rest area into the user's palm and against the user's palmar saddle area 34. Stabilization may be useful in embodiments in which the combined center of gravity of the holder and a hand tool held thereby is not centered directly above the first hand rest area, or is variable. For example, although not required to all embodiments, holder 100 is laterally symmetrical.

If a paintbrush or other tool supported in the holder is also laterally symmetrical, then the combined center of gravity of the holder and the tool will be located along the holder's plane of symmetry, but still may be forward or rearward of the first hand rest area, considering that paintbrushes and other hand tools may have varying weights and weight distributions. Further, if the tool itself is designed to bear a load, such as the head of a paintbrush, which may carry paint or another substance to be applied to a surface, the center of gravity may change during use of the tool. As such the handgrip configuration may allow a user to account for such variables by maintaining slight pressure against the grip area with one or more fingers.

Optionally, as described in greater detail below, some embodiments of the ergonomic tool holder may include or be used with a counterweight device configured to move the fulcrum of the holder and its load, that is, to transfer the center of gravity of the holder and the hand tool supported thereby, when the holder is held, toward the first hand rest area. For example, FIG. 1 shows a selectively attachable counterweight device 150 in the form of a weight-bearing clip 152 mounted on the end of handle 12 of the paintbrush.

Like a counterweight device, a handgrip configuration is not required to all embodiments of the ergonomic tool holder. For example, an ergonomic tool holder may include a strap configured to secure a user's hand to the tool holder as an alternative to a handgrip. In some examples, the ergonomic holder includes both a hand grip and a strap. The strap may be made of non-resilient materials, such as fabric, cord, or plastic, or made from resilient materials such as rubber or elastic. The strap serves to redistribute a significant portion of the weight of the holder and tool combination to the larger muscles of a user's arm as opposed to the user's hand muscles. In some examples, the strap can support the entire weight of the holder and tool combination.

In some examples, the effective length of the strap is adjustable. The effective length of the strap corresponds to the length of the portion of the strap available to receive and secure the user's hand. The effective length of the strap may be adjusted with buckles, buttons, cleats, and/or hook-and-loop fasteners in known manners. Adjusting the effective length of the strap enables the tool to accommodate larger and smaller hands and to facilitate user comfort by increasing or decreasing how tightly the strap secures the user's hand.

As a further example of an ergonomic tool holder that does not include a handgrip of the form described above, FIG. 6 shows, at 200, a second illustrative embodiment of an ergonomic tool holder, shown holding a hand tool 10 in the form of a paintbrush. As with holder 100, the second illustrative embodiment shown as tool holder 200 includes a body 202, but does not include a handgrip. Instead, holder 200 is shown to include a brace portion 204 extending downwardly from a bottom region of body 202.

Similar to holder 100, body 202 of holder 200 includes forefinger and thumb rest areas 206 respectively defined by outwardly-facing surfaces 208 of opposing side regions of the body 202, a first hand rest area 210 defined by a bottom-facing surface 212 of the body 202 disposed rearward of the forefinger and thumb rest areas 206, and a second hand rest area 214 defined by a rearward-facing surface 216 of the brace portion 204. Holder 200 is also held in a similar manner in a user's hand, with the user's forefinger and thumb engaging the forefinger and thumb rest areas 206; when so held, the first and second hand rest areas 210, 214 respectively engage the dorsal saddle area and the palmar saddle area of the user's hand. Additionally, a continuous intermediate surface 218 extending between the first and second hand rest areas 210, 214 engages the region between thumb and forefinger of the user's hand, when the holder 200 is so held.

Also similar to holder 100, body 202 of holder 200 supports paintbrush 10 by means of a tool support portion 230, which is shown to be adapted to hold a portion of paintbrush 10 therein, with the working end thereof, e.g., the paintbrush head 16, oriented forward from a forward end region of the body 202. Although not specifically illustrated, the tool support portion 230 of holder 200 is configured somewhat similarly to that of holder 100, in that it includes a channel disposed between, and defined by, a pair of parallel walls having interior surfaces adapted to retain a portion of the paintbrush.

Because the body 202 of holder 200 is abbreviated in size as compared with that of holder 100, it may be configured to engage the paintbrush (or other hand tool) closer to the center of gravity of the hand tool. Thus, as shown, the tool support portion 230 of holder 200 is shown to engage more of the neck 14 and the ferrule 18 of paintbrush 10, rather than its handle 12, as compared with tool support portion 106 of holder 100. Additionally, tool support portion 230 is shown to include retaining means in the form of a pair of magnets 232 positioned to attract the metallic ferrule 18 of the paintbrush held therein.

Holder 200 is also shown to include a counterweight device 250 configured similarly to that of holder 100; that is, counterweight device 250 is in the form of a selectively attachable clip 252 mounted on the end of handle 12 of the paintbrush. Clip 252 carries weights 254, which, as explained below, may be interchangeable with heavier or lighter weights.

The relatively abbreviated size and minimized design of holder 200 may offer advantages over the configuration of holder 100, such as in manufacturing, by requiring less material and/or fewer fabrication steps. For example, the construction of holder 200 may be unitary, such as being formed from a single piece of material such as an elastomer or other flexible material.

Holder 200 may be customized for use with a paintbrush of a particular gauge, size, weight, configuration, and so forth; for example, holder 200 may be fabricated for a particular paintbrush type having known dimensions and a known center of gravity, such that the holder may be shaped to receive the paintbrush and weighted so that the combined weight of the paintbrush and the holder (with, or without, a counterweight device such as 250) is centered above the first hand rest area 210. Holder 200 optionally may be adapted to be permanently coupled to a paintbrush, for example by the inclusion of adhesive surfaces in the tool support portion configured to bond with the portion of the paintbrush received therein.

In general, the larger a user's hand, the greater the thickness of the saddle of the user's hand. Of course, different hand proportions may result in a thicker or thinner saddle area even among individuals having the same hand size. In some embodiments, the ergonomic hand tool holder may accommodate different hand sizes and/or proportions, such as by lacing adapted to conform to saddle areas of different dimensions. For example, such as with the configuration shown in holder 200, the material from which the holder is fabricated may itself be flexible enough to allow the holder to conform to different hand sizes. However, other embodiments, such as embodiments similar to the holder shown at 100 may include one or more articulating components, for example a handgrip that is configured to articulate, such as to adjust the angle and/or distance between the first and second hand rest areas. Such a feature may allow users having different hand sizes to find a comfortable "saddle fit" for their hands, or may simply allow a user to choose to make the fit of the holder looser or more snug, by adjusting the articulating component(s).

Figure 7:
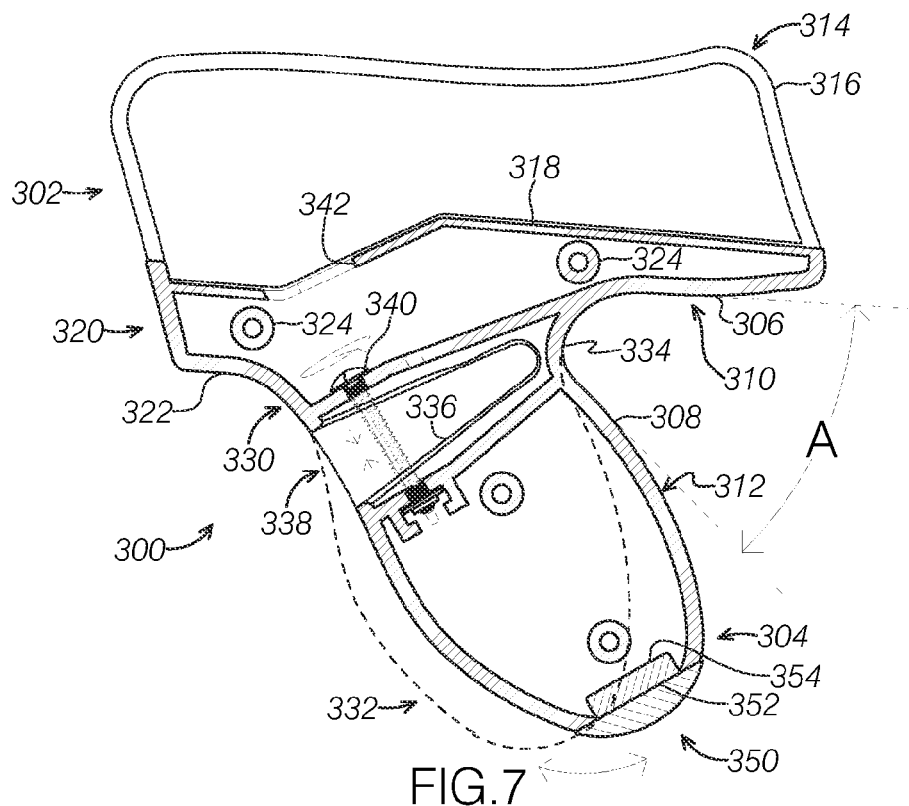
FIG. 7 shows a left side cutaway view of a third example embodiment of an ergonomic tool holder constructed in accordance with the present disclosure, illustrating interior structure of the handgrip.

FIG. 7 is a cutaway view illustrating, at 300, a third example embodiment of an ergonomic tool holder. Although presented as a separate example embodiment from holder 100, this is simply for ease of explanation, as the cutaway view shown in FIG. 7 may indicate the interior of holder 100. Indeed, holder 300 features an overall external configuration that is substantially similar to that of holder 100, in that holder 300 forms a body 302 and a handgrip 304 extending generally downward from a bottom region thereof, and includes first and second hand rest areas 306, 308 defined, respectively, by a bottom-facing surface 310 of the body 302 disposed rearward of handgrip 304, and a rearward-facing surface 312 of the handgrip 304.

Although not specifically shown, holder 300 includes a tool support portion generally indicated at 314, disposed between opposing side regions of the body 302 and configured to receive and hold at least a portion of a hand tool therein. Tool support portion 314 may be substantially similar (or identical) to tool support portion 106 of holder 100, in that it includes a channel defined by a parallel pair of longitudinal walls 316 and a channel floor 318. As noted above, however, the precise configuration of tool support portion and an optional retaining means incorporated therein may be varied from those shown and described herein without departing from the concepts encompassed by this disclosure.

Also although not shown in this view, holder 300 includes forefinger and thumb rest areas disposed on outwardly-facing surfaces of the opposing side regions of the body 302, such that the holder may be held as described above, engaging the saddle area of a user's hand when held.

In the view shown in FIG. 7, which may represent one of two substantially symmetrical cases 320 that may be fastened together to form the holder 300, the body 302 and the handgrip 304 are shown to be defined by an exterior wall 322 that forms the case and bounds a mostly hollow interior. The case is shown to include several bosses 324, such as to receive corresponding fastening posts or screws when coupled to its mate, but other embodiments may employ different interior structure and/or modes of fabrication and assembly.

The handgrip 304 of holder 300 articulates to adjust the angle A between the first and second hand rest areas. The handgrip may be thought of as including a proximal section 330 a distal section 332, such that the distal section is configured to articulate with the proximal section. As will become clear from the following description, however, the articulating mechanism may be disposed at any point along the handgrip, such as at the joint between the handgrip and the body, such that the handgrip may be described to articulate with the body, irrespective of the proximal and distal sections of the handgrip.

The articulation of handgrip 304 is accomplished by means of a hinge 334 formed by a section of wall 324 located on the rear of handgrip 304 that connects the proximal and distal portions, which are otherwise separate from each other (e.g., on the opposing sides and the forward sides of the handgrip). A V-spring 336 sits in the section 338 intermediate the proximal and distal sections, biasing the forward edges of said sections away from each other, and an adjustment screw is threaded through the ends of the V-spring and secured on either end to portions of the wall 322 forming the proximal and distal sections. From this configuration, it is clear that adjustment of angle A may be accomplished by turning the adjustment screw in either direction, such as by means of a screwdriver (not shown) inserted through an opening 342 in channel floor 318, which correspondingly adjusts the distance between the forward edges of the proximal and distal sections, allowing the distance between the first and second hand rest areas to be changed.

The adjustment screw 340 thus also operates to lock the handgrip in a selected position. The limits and relative ease of adjustment, in this configuration, may be a function of the length of the adjustment screw, the resiliency of the material chosen for the wall 322 of the case 320, the resiliency of the V-spring, and so forth. Typically, the intermediate section is formed of (or filled with) a compressible and resilient material such as a thermoplastic polyurethane ("TPU") or similar elastomer, for example to provide mechanical stability to the configuration and relieve stress on the portion of wall 322 that forms the hinge 334.

Also, although not required to all embodiments, FIG. 7 illustrates an optional holder mount feature, such as to allow a user to set the holder aside temporarily while maintaining the holder in an upright orientation. This feature may be advantageous in applications in which the tool supported by the holder is a wet paintbrush. Specifically, a holder mount 350 includes a recess 352 formed in the terminal end of the handgrip 304, having a magnet 354 housed within the handgrip adjacent the recess. This arrangement would be suitable for use with a corresponding magnet or metallic stand (not shown) mounted on a tabletop or other work surface, a ladder or scaffolding, and so forth, to which the holder mount could be attached in order to free the user's hands, for example during a rest period or to allow the user to perform another task. Of course, such a holder mount may be used for longer-term storage of the holder as well. The configuration and position of a holder mount feature may be as desired, and may incorporate different attachment mechanisms such as a snap-on fitting, a clamp, and so forth, as suitable for a corresponding mounting site.

Figure 8:
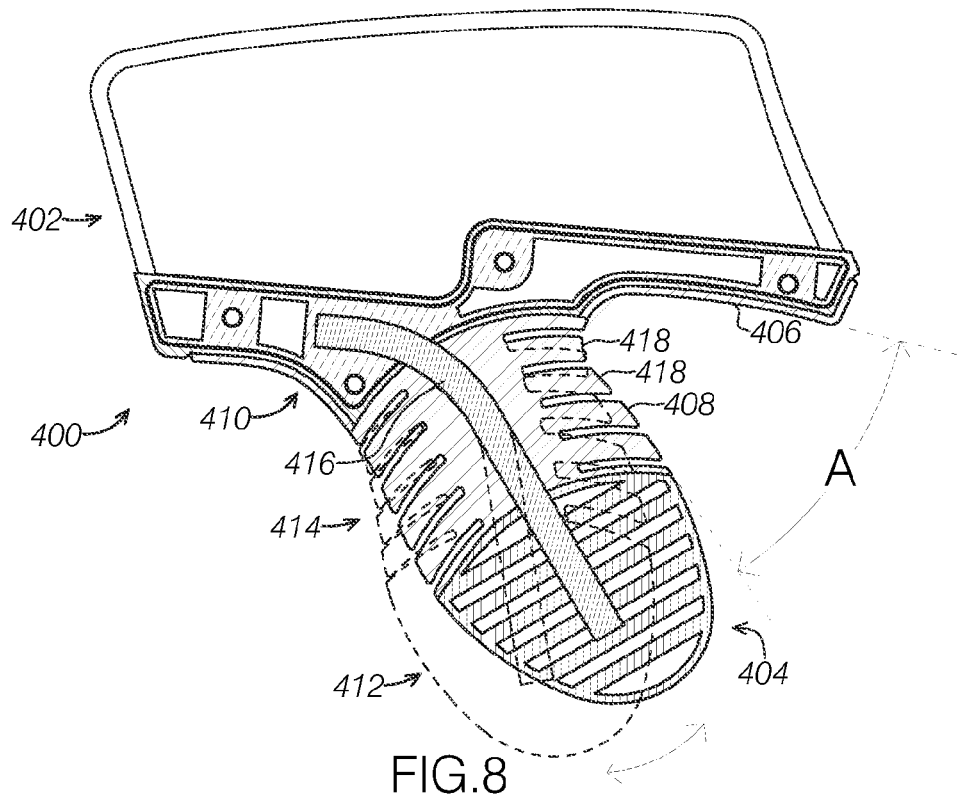
FIG. 8 shows a left side cutaway view of a fourth example embodiment of an ergonomic tool holder constructed in accordance with the present disclosure, illustrating interior structure of the handgrip.

The articulation enabled by the handgrip configuration shown in FIG. 7 may be accomplished in any of several alternative manners. For example, FIG. 8 is a cutaway view illustrating, at 400, a fourth example embodiment of a tool holder, which, similar to holders 100 and 300, is formed of a body 402 from which an articulating handgrip 404 extends. Apart from minor design differences that do not affect the function of the holder, it can be assumed that holder 400 operates in the same manner as holders 100 and 300 in terms of the manner in which the holder is held by a user, in which first and second hand rest areas 406, 408 engage the saddle area of a user's hand when the holder is grasped with thumb and forefinger, and the manner in which the weight of the holder and a tool held hereby is distributed to the dorsal saddle area of the user's hand when so held.

Handgrip 404 is shown to include a proximal section 410, a distal section 412, and an intermediate section 414 disposed therebetween. A connecting strut 416 extends between and connects the proximal and distal sections, with an end anchored in each section, which are shown to be substantially solid in construction and are formed of a suitably rigid material, as noted above. Intermediate section 414 is formed of a compressible, resilient, and comparatively more flexible material, such as TPU or a similar suitable elastomer, and also formed of a number of stacked ribs.

The connecting strut is fabricated from a malleable material such as aluminum or a suitable metal alloy, and, owing to the flexibility of the intermediate section, is bendable therein. Accordingly, the articulation of handgrip 404 is achieved simply lay bending the portion of the strut 414 housed within the intermediate section, to adjust the angle A between the first and second hand rest areas. The strut may be formed to limit the bending thereof to within only one plane, such as the vertical plane of symmetry of the holder, such as by conventional means; alternatively, bending may be limited by the geometry of the intermediate section, such as by providing spacing between adjacent ribs on the forward and rear sides of the handgrip, but not on opposing sides, and so forth. Similar techniques may also function to retain the handgrip in a desired position after adjustment.

As noted above, other articulation means are possible, including a ball and socket mechanism, a gear mechanism, variations of the illustrated spring biased adjustable screw and bendable connecting strut configurations, and so forth. Independent of the actual configuration employed, adjusting the angle and/or distance between the first and second hand rest areas of a holder by means of an articulating handle allows the holder to be adjustable to a user's hand size or proportion and/or to a desired fit. Not only may such adjustability be favorable from the standpoint of user comfort when holding the holder, but providing a snug fit against the saddle area of a user's hand may increase user control and ease of manipulation of the tool held in the holder, and correspondingly reduce the need for exerting finger pressure on the handgrip, factors that contribute to reducing user fatigue and the possibility of stress injuries.

Figure 6:
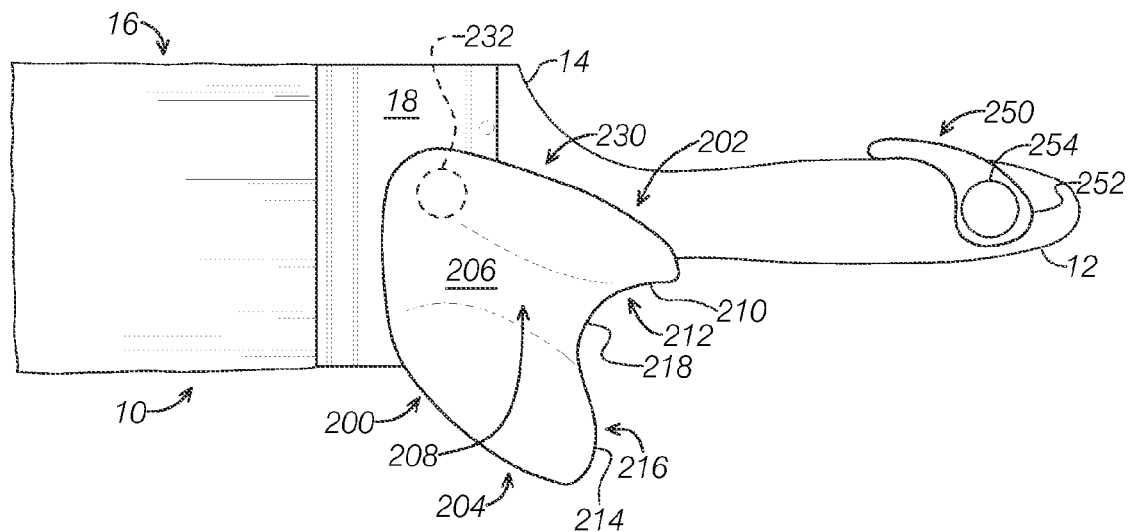
FIG. 6 shows a left side elevation view of a second example embodiment of an ergonomic tool holder constructed in accordance with the present disclosure, supporting a conventional paintbrush. A clip-on counterweight device, such as shown in FIG. 1, is shown to be mounted to the handle of the paintbrush.

As noted above, the ergonomic tool holders disclosed herein are designed to distribute the combined weight of the holder and the tool supported thereby to the dorsal saddle area 36 of a user's hand 20. As such, the first hand rest area of the holders disclosed herein is generally configured to be broad in width and length, such as to encompass a large region of the dorsal saddle area. User fatigue is reduced when the center of gravity of the combined load is located above the first hand rest area, because the weight is borne by the user's arm, and fewer muscles of the user's fingers, wrist, and hand are needed to balance the holder. To this end the ergonomic tool holders may include a counterweight device (150, 250) such as shown in FIGS. 1 and 6 in the form of a selectively attachable clip (152, 252) that bears a weight (154, 254). Counterweight devices 150, 250 are shown as separate from an ergonomic holder, and thus may be thought of as part of an ergonomic system that includes the holder and the separate counterweight device. Optionally, as explained in greater detail below, many of the various counterweight devices according to the present disclosure may be used independently of an ergonomic holder.

Figure 9:
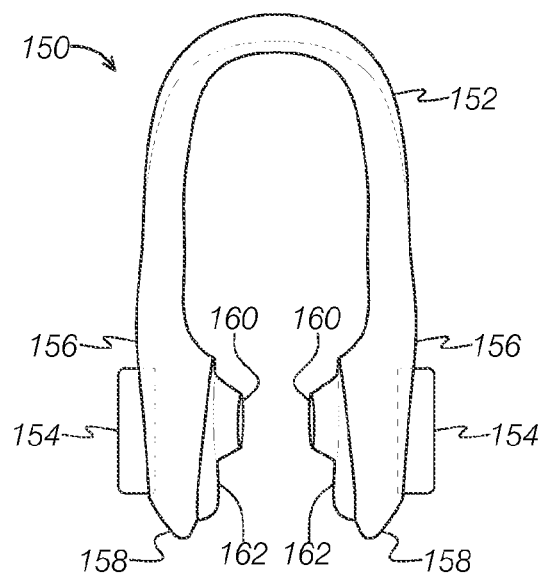
FIG. 9 shows a front elevation view of the clip-on counterweight device shown in FIG. 1.

Counterweight device 150 is shown in greater detail in FIG. 9. Counterweight device 250 may be assumed to be of similar construction and configuration. The illustrated example configuration is adapted to snap on to the handle of a paintbrush, and as such includes a flexible, hinged clip 152 fabricated from a flexible polymer or other suitable material, and bears a pair of counterweights 154, such as on the exterior surfaces 156 of opposing ends 158 of the clip 152. Although not required to all embodiments, counterweight device 150 is configured to fit against and partially within the hang hole located near the end of the handle of conventional paintbrushes, by means of correspondingly-shaped knobs 160 located on the interior surfaces 162 of the ends of the clip. Counterweights 154 may he permanently bonded to and/or housed within the counterweight device 150, or optionally may be selectively detachable, such as by means of mechanical, magnetic, or other fittings, with mounting sites on the ends of the clip, such as to allow a user to use counterweights 154 of different masses. Such detachable counterweights may optionally be color-coded or otherwise marked for ease of recognition, and marketed together with clip 152 as a kit for use with the holders disclosed herein, or, as explained below, for use independently of a holder.

As noted above, counterweight devices 150, 250 are shown as separate components from holders 100 and 200, but some holder embodiments may include one or more connected counterweight devices. For example, a clip such as clip 152 or 252 may be connected to the body of a holder by means of a tether, allowing a user the option of connecting the clip to the tool used with the holder. Other holder embodiments may incorporate or integrate one or more counterweight devices.

Figure 10:
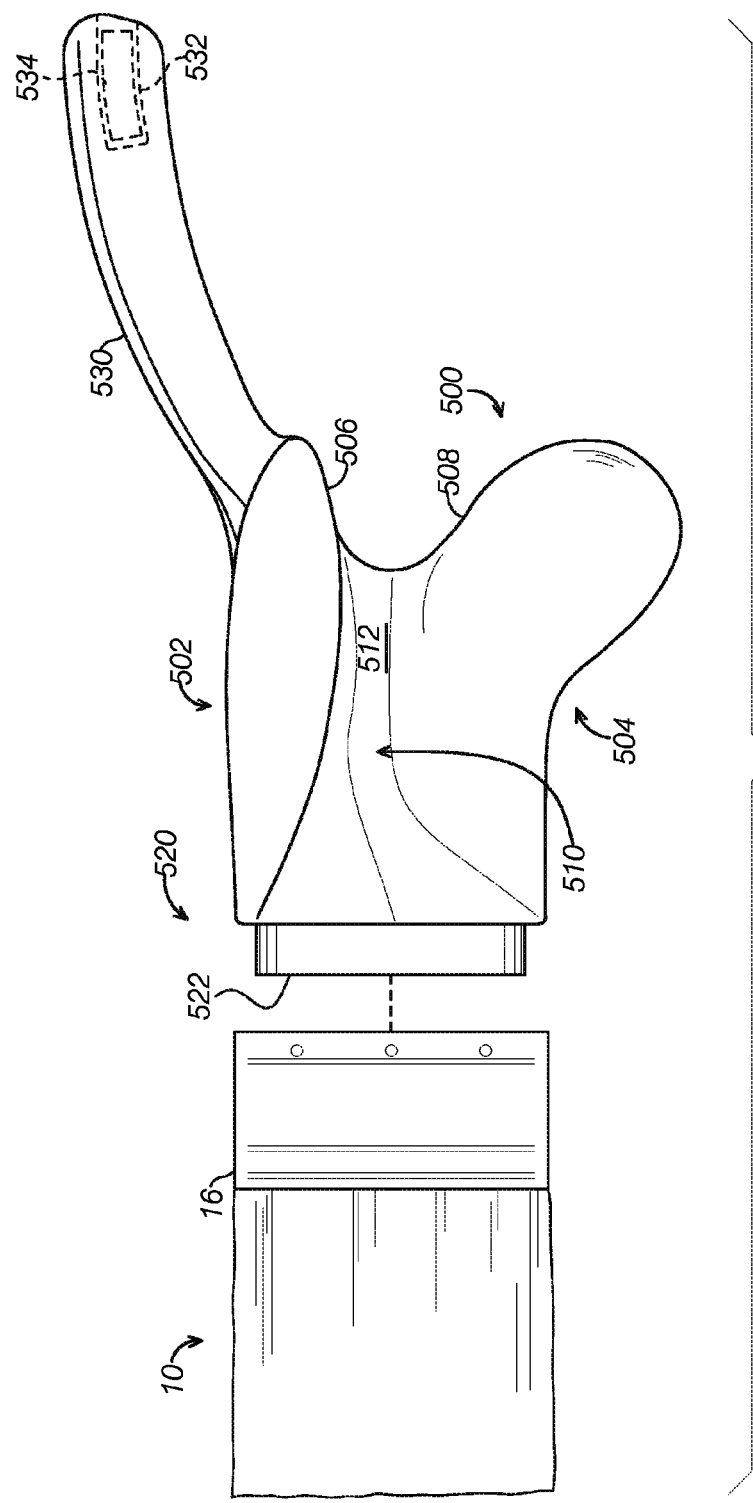
FIG. 10 shows a left side elevation view of a third example embodiment of an ergonomic tool holder constructed in accordance with the present disclosure, supporting a detachable paintbrush head.

For example, a fifth example embodiment of an ergonomic tool holder, shown at 500 in FIG. 10, integrates a counterweight device. More particularly, holder 500 is formed of a body 502 from which a handgrip 504 extends generally downward from a bottom region thereof in a manner similar to holders 100, 300, and 400. Body 502 and handgrip 504 are also similarly configured in that corresponding surfaces thereof form first and second hand rest areas 506, 508, and outwardly-facing surfaces 510 disposed on the opposing side regions of the body define forefinger and thumb rest areas 512, allowing the holder to engage the saddle of a user's hand when the holder is held with the user's forefinger and thumb engaging the forefinger and thumb rest areas 512.

Holder 500 also includes a tool support portion 520 adapted to support at least a portion of a hand tool with the working end thereof oriented generally forward from a forward end region of the body. More specifically, in this embodiment, tool support portion is disposed on the forward end region of the body and is in the form of a mounting base 522 that is configured to detachably receive the head 16 of a paintbrush 10, or any such interchangeable tool portion provided with corresponding structure to mate with base 522.

Holder 500 is also shown to include a handle 530 extending rearward from the rear end of the body 502, and is oriented slightly upward to provide clearance for the forearm not shown) of a user holding the holder 500. In this embodiment, the handle 530 can be thought of as having at least two functions. First, the handle may provide a built-in reach extension for the paintbrush head or other tool portion mounted to the tool support portion 520. Second, the cantilevered weight of the handle functions as an integrated counterweight device for the combined load of the holder and the tool portion supported thereby, to locate the center of gravity of the load over, or at least move it toward, the first hand rest area. Toward this end, the handle 530 is provided with a chamber 532 adapted to accept one or more removable weights, indicated generally at 534. The weight or weights may take any desired form, such as shaped to fit completely within the chamber 532, as shown, or may be larger, and provided with mating structure adapted to be received within chamber 532.

As such, the integrated counterweight device of holder 500 represents one example of a counterweight device for use with an ergonomic holder. As mentioned above, some embodiments of a counterweight device in accordance with the present disclosure may be designed for attachment to a portion of a paintbrush handle, or a handle of another hand tool, and thus may be used independently of an ergonomic holder for the paintbrush or hand tool. A non-limiting, illustrative example of such a counterweight device is shown in FIGS. 1 and 9 as counterweight device 150, and in FIG. 6 as counterweight device 250. In other words, even though counterweight devices 150, 250 are shown to be used with ergonomic holders 100, 200, respectively, this is not required to all embodiments of ergonomic holders or counterweight devices.

Figure 11:
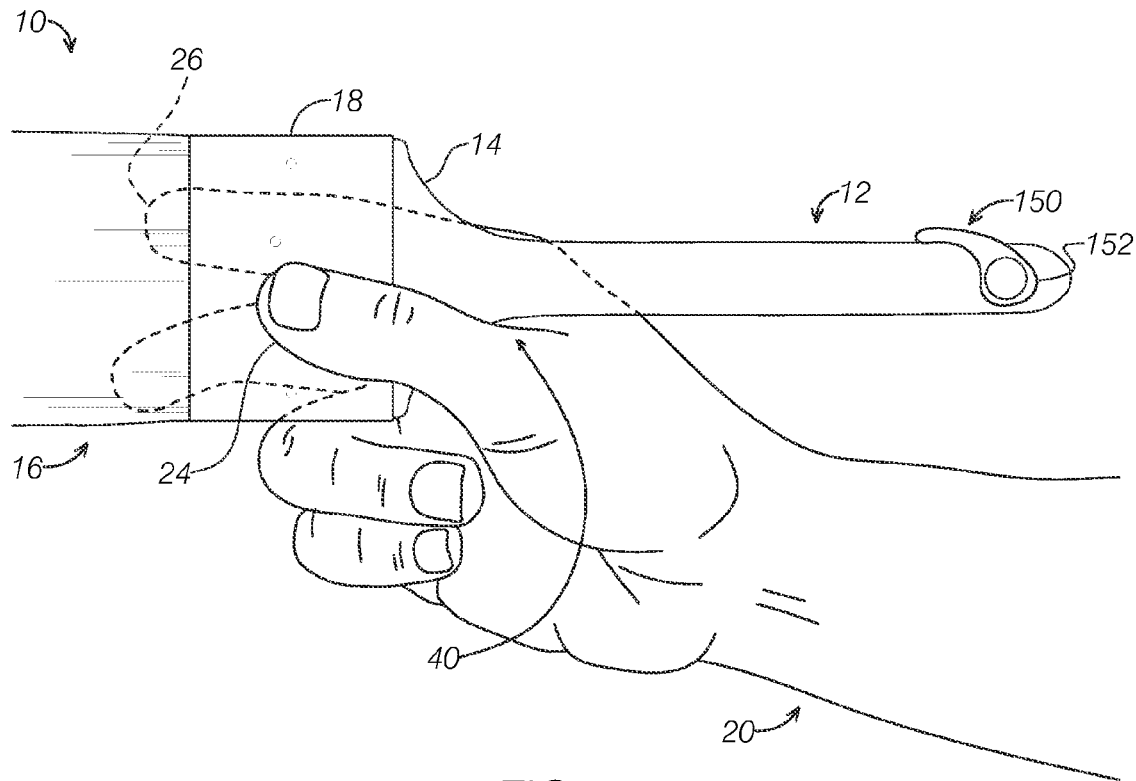
FIG. 11 shows a left side elevation view of one manner in which a conventional paintbrush may be held in a user's hand, with the clip-on counterweight device shown in FIGS. 1 and 9 shown to be mounted to the handle of the paintbrush.

For example, FIG. 11 shows a hand tool 10, again in the form of paintbrush, and one manner in which the paintbrush may be held directly in a user's hand 20 specifically, with a portion of the neck 14 of the paintbrush 10 resting against the saddle 40 of the user's hand 20, and with the user's thumb 24 and forefinger 26 engaging opposite sides of the ferrule 18 of the paintbrush. Such a grip of the paintbrush 10 (as opposed to grasping the handle in a "handshake" grip) may be preferable for a user doing detail or trim paint or stain work. Such work typically involves side-to-side motion of the head 16 of the paintbrush 10, such as effected by the user's wrist movement and/or pressure on either side of the ferrule 18 from the user's thumb or forefinger. As explained above, the center of gravity of the paintbrush is typically located nearer to the forward end of the paintbrush than the rear end, especially when the paintbrush head is wet with paint, and therefore use of the paintbrush (even when held as illustrated) may cause user fatigue because the same muscles that manipulate the brush also bear the load thereof.

In such a grip, the handle 12 extends rearward over the user's wrist, as shown. Accordingly, a counterweight device, such as counterweight 150 (shown, again, in the form of a weight-bearing clip 152 mounted on the end of handle 12 of the paintbrush) may effectively shift the center of gravity of the paintbrush generally rearward along the longitudinal axis of the paintbrush to a predetermined extent, such as to locate the center of gravity of the paintbrush and counterweight device over the saddle area of the user's hand, relieving the user's fingers and wrist from bearing the weight of the brush.

Figure 12:
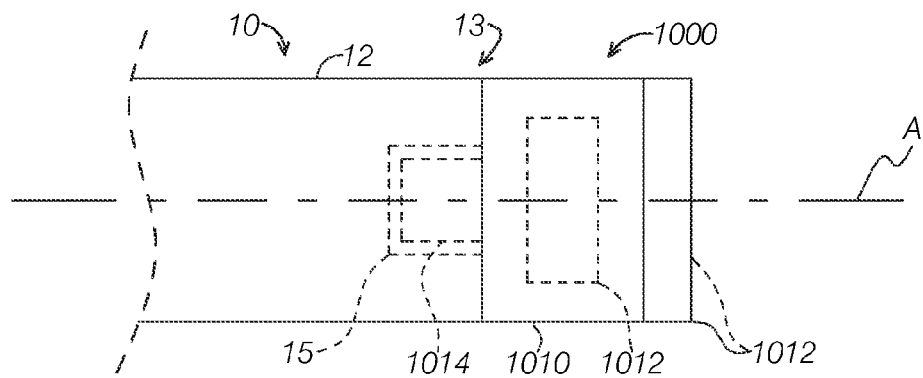
FIG. 12 is a schematic view representing counterweight devices in accordance with the present disclosure.

A counterweight device, such as counterweight device 150 or 250, may take a number of physical forms similar to or different from the clip-on configurations shown and discussed above. To illustrate, FIG. 12 shows, in a schematic fashion, various functional components of counterweight devices according to the present disclosure, which nay be adapted for use with a hand tool such as a paintbrush—that is, a hand tool having a forward working end and a handle extending generally rearward from the working end along a longitudinal axis and terminating at a distal end.

Typically, as explained above, such a hand tool has a center of gravity located more toward the forward, working end than toward the distal end of the handle. In other words, the center of gravity is generally along the longitudinal axis forward of the midpoint between the working and distal ends. In FIG. 12, a generic hand tool is partially and schematically shown at 10 to include a handle 12 extending generally along a longitudinal axis A and having a distal end 13.

In general, a counterweight device 1000 according to the present disclosure includes a counterweight body 1010 configured for selective mounting to a portion of the handle 12, and one or more counterweights 1012 supported on the counterweight body 1010. So mounted, the counterweight device 1000 is adapted to shift the center of gravity of the hand tool or paintbrush 10 (or, to be more accurate, the center of gravity of the combined weight of the hand tool and the counterweight device) rearward along axis A to a predetermined extent when the counterweight body 1010 is mounted to the handle 12. In many embodiments, the extent to which the center of gravity is shifted is proportional to the weight of the counterweight device.

As noted above, the physical configuration(s) one or more of the components of the counterweight device 1000 is/are not particularly limited, and in many cases may be dimensioned, shaped, or otherwise configured to interface with a particular feature of a type of handle and/or tool. For example, as indicated above, handles of conventional paintbrushes typically include a hang hole disposed tear the distal end that extends through the handle; in some embodiments, the counterweight body may take a physical form (such as by including a protrusion or a post portion) that is adapted to engage the hang hole, and so forth. This is shown schematically in FIG. 12 with paintbrush 12 having an opening 15 formed therein, which may represent a hang hole or other type of opening formed in the paintbrush handle, in which a portion 1014 of the counterweight body 1010 is received. Opening 15 and portion 1014 are shown in dashed lines to represent that such features are not required to all types of hand tools or counterweight device embodiments.

The counterweight body 1010 may be selectively mounted on the handle 12 by any suitable means, such as a friction fit, through the use of an adhesive, a magnetic, or another mechanical coupling, and so forth, or combinations thereof. Such mounting means may be permanent or temporary, such as to allow a user to attach and detach the device with a tool handle as desired. Moreover, the mounting means and orientation may, to some extent, depend on the portion of the handle to which the counterweight body 1010 may be mounted. For example, although counterweight body 1010 is shown to be positioned against and coaxial with the distal end 13 of the handle 12, this is not required to all embodiments, as discussed with reference to various example embodiments below.

Similarly, the physical configurations of, and/or coupling methods utilized for, the one or more counterweight 1012 are not particularly limited. One or more counterweights 1012 may be attached, permanently or removably, to counterweight body 1010, and/or to other counterweights 1012 mounted to the counterweight, body 1010, as shown in solid and dashed lines. In some embodiments, one or more counterweights 1012 may be incorporated with and/or contained within counterweight body 1010, as shown in dashed lines, and so forth.

Optionally, counterweight device 1000 may include multiple interchangeable counterweights 1012, any two or more of which may have different weights, such as to allow a user to decide which counterweight or counterweights to use with the counterweight device. For example, a counterweight device may have one counterweight permanently attached to the counterweight both to which a user may optionally attach additional counterweights, such as by means of a magnetic coupling, a mechanical coupling such as a snap-fit, and so forth. In other examples, one or more counterweights may be configured to be detachably mounted on the same counterweight body, and so forth.

Additional non-exclusive ex ample configurations of counterweight devices according to the present disclosure, and implementing various features discussed above in more particular physical configurations, are discussed with reference to FIGS. 13-17. Where appropriate, the reference numerals from the schematic illustration of FIG. 12 are reiterated, generally in increments of 100, to designate corresponding parts of the counterweight devices, as well as the assemblies and/or components thereof. For brevity, each previously discussed component or variants thereof may not be illustrated or otherwise discussed again with respect to later-discussed embodiments, however, it is within the scope of the present disclosure that the previously discussed aspects may be utilized with any of the counterweight devices described herein. For simplicity, the example configurations are discussed herein with respect to a paintbrush handle, but it is within the scope of the disclosure that the counterweight devices may be adapted for use with a handle of any suitable hand tool.

Figure 13:
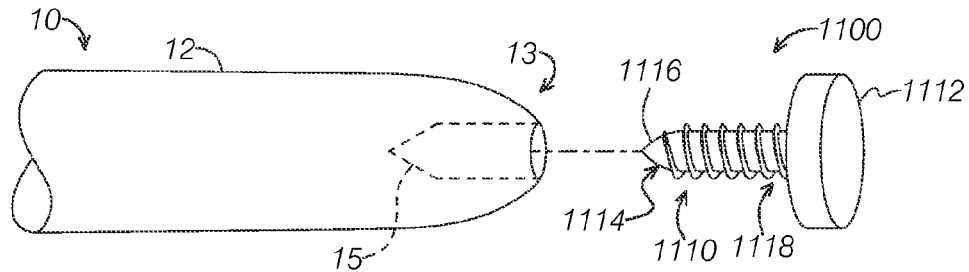
FIG. 13 is a side view of an illustrative embodiment of a counterweight device in accordance with the present disclosure, and a method of mounting the device on a paintbrush handle.

Turning to FIG. 13, a simplified view of such an illustrative embodiment of a counterweight device 1100 is presented. In FIG. 13, counterweight device 1100 is shown as having a counterweight body 1110 to which is attached a disc-shaped counterweight 1112. In counterweight device 1100, counterweight body 1110 is shown to include a post portion 1114 adapted to be received in a corresponding opening 15 in handle 12 of hand tool 10. In particular, opening 15 is formed at the distal end 13 of the handle and extends into the handle along the longitudinal axis thereof.

A distal end 1116 of the post portion 1114 is shown to be threaded, so as to engage the opening in a rotational interference fit. Counterweight 1112 is shown to be supported on a proximal end 1118 of the post portion 1114, which protrudes from opening 15, in any suitable manner (such as, for example, removably mounted thereon, such as by a threaded or other fitting, permanently mounted thereto, such as by an adhesive or by being formed unitarily with the post portion 1114, etc.).

In variants of device 1100, post portion 1114 may be otherwise textured, or not textured, such as to achieve a friction fit with the interior of the opening of a desired strength. For example, post portion 1114 may, in some embodiments, be designed to be secured more or less permanently into the handle opening 15. In such embodiments, counterweight 1112 may be removable mounted on the post portion 1114 so that when not in use, the counterweight may be detached for storage, or interchanged with another counterweight having a different weight, and so forth. In other embodiments, the counterweight body 1110 and counterweight 1112 may be of unitary construction and/or be adapted to be screwed into and unscrewed from the handle according to user preference, and so forth.

Opening 15 may be provided in handle 12, or formed therein by a user, such as when installing post portion 1114. For example, the threaded distal end 1116 of the post portion may be screwed in to the distal end 13 of the handle, such as by a user, forming opening 15. Optionally, a user may pre-drill a hole into handle 12 to form opening 15, into which the post portion 1114 of a counterweight device 1100 may be received.

Figure 14:
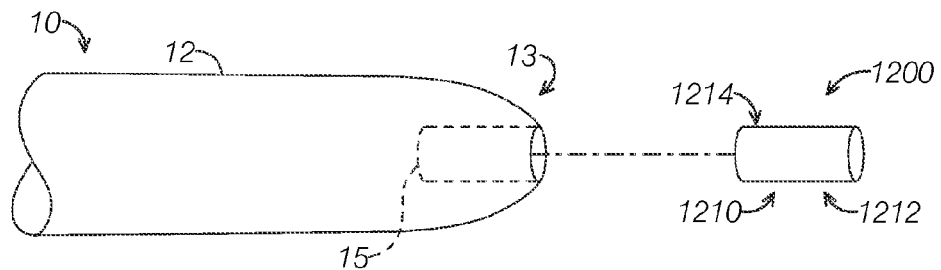
FIG. 14 is a side view of another illustrative embodiment of a counterweight device in accordance with the present disclosure, and a method of mounting the device on a paintbrush handle.

Another illustrative embodiment of a counterweight device 1000 that is configured for such an opening is shown in FIG. 14 as counterweight device 1200. Counterweight device 1200 is shown to have a simplified, more compact configuration as compared with counterweight device 1100. In particular, in counterweight device 1200, the counterweight 1212 is integral with the post portion 1214 of the counterweight body 1210. Also, although not required to all embodiments, counterweight device 1200 is adapted to fit substantially or entirely within opening 15 in handle 12.

Optionally, the proximal end 1218 of the post portion 1214 may be adapted to provide a mounting site for additional counterweights (not shown), such as by incorporating a magnetic feature, a mechanical coupling, or otherwise. Optionally although not specifically shown as such, all or part of the exterior surface of the counterweight device 1200 may be textured or otherwise configured to form a friction fit of a desired strength or character with opening 15.

Moreover, in either of the two example embodiments of counterweight devices 1100, 1200 discussed above, although shown to be substantially cylindrical, the overall shape of the portion of the counterweight body adapted to be received in an opening 15 formed in a handle 12 may be configured as desired, such as having a non-circular cross-section, a wedge shape, and so forth. Accordingly, such variations are considered to be within the scope of the present disclosure.

In hand tools in which an opening 15 is already provided, such an opening may be in any suitable form, such as extending inward from the distal end 13 of the handle as shown in FIGS. 13 and 14, or otherwise. As noted above, one form of opening, which is common in conventional paintbrushes, is a hang hole that extends from one side of the handle to the other.

Figure 15:
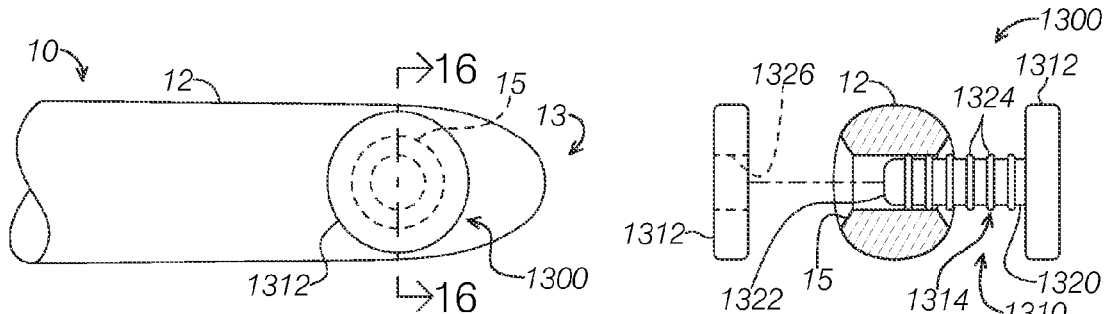
FIG. 15 is a side view of yet another illustrative embodiment of a counterweight device in accordance with the present disclosure, mounted on a paintbrush handle.
Figure 16:
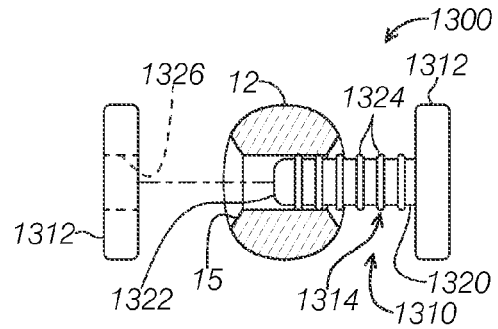
FIG. 16 is a cross-sectional view of the paintbrush handle of FIG. 15 taken along the line 16-16, showing a method of assembling the counterweight device of FIG. 15 to mount the device on the paintbrush handle.

An illustrative embodiment of a counterweight device that is configured for use with a hang hole opening is shown in FIGS. 15 and 16 as counterweight device 1300. In FIG. 16, opening 15 is shown as a hang hole that extends through paintbrush handle 12, and is disposed proximate to a distal end 13 of the handle 12. FIG, 16 also shows that: counterweight device 1300 has a counterweight body 1310 that includes an elongate post portion 1314 adapted to extend through hang hole 15. Post portion 1314 includes first and second ends 1320, 1322 to which counterweights 1312 are mounted.

More specifically, counterweight device 1300 is shown in FIG. 16 in a partially exploded view to have a first counterweight 1312 supported on first end 1320, and a second counterweight 1312 adapted to be detachably mounted to second end 1322.

Post portion 1314 includes an exterior surface that is textured. In particular, post portion 1314, which may be fabricated of any suitably rigid material such as a metal or any of several plastics, is shown to include a series of elastomeric ribs 1324 disposed thereon. The ribbed exterior of post portion 1314 is, in the illustrated embodiment, configured to provide a friction fit with the interior of the hang hole 15, and also provides a friction fit with an opening 1326 formed in second counterweight 1312. The friction fit provided by ribs 1324 thus function to retain the counterweight body 1310 on the handle 12, and also function to retain the second counterweight 1312 on the post portion 1314.

In variants of this embodiment, the friction fit may be provided by any suitable means, such as a textured pattern on the surface of the post portion, a shaped post portion, and so forth. Moreover, the post portion in some embodiments may be configured only to retain the second counterweight device 1312 on the second end 1322 rather than to also engage the interior of the hang hole 15. Such embodiments may thus be suitable for use with paintbrushes having hang holes of different diameters.

Typically, for even weight distribution, the first and second counterweights 1312 are of equivalent weight, but this is not required to all embodiments. In some variants, both counterweights 1312 are removable, for example to allow a user to select different pairs of counterweights in order to achieve a desired weight balance of the tool. In yet other variants, the counterweights 1312 may be configured to allow additional counterweights to be mounted to the exterior surfaces thereof, such as by a magnetic, mechanical, or some other manner of coupling.

In counterweight devices 1100, 1200, and 1300, the counterweight body includes a post portion adapted to engage and be retained on a tool handle by means of engaging an opening in the tool handle. An illustrative embodiment of a counterweight device configured to fit around a portion of the handle is shown in FIG. 17 as counterweight device 1400.

Figure 17:
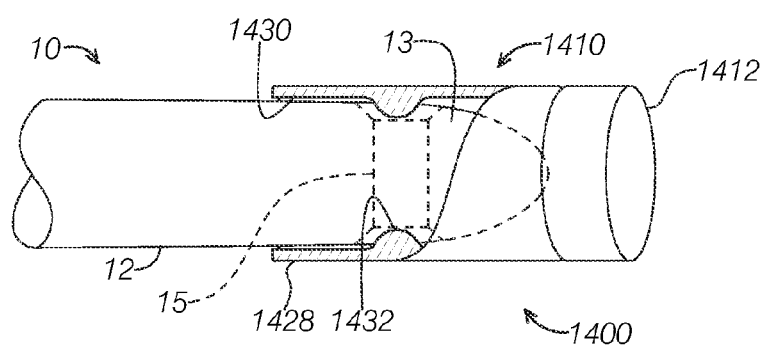
FIG. 17 is a side view of yet another illustrative embodiment of a counterweight device in accordance with the present disclosure, shown in partial cross-section to illustrate a method of mounting the device on a paintbrush handle.

As shown in FIG. 17, counterweight device 1400 includes a counterweight body 1410 and a counterweight 1412 supported thereon. Counterweight body 1410 includes a sleeve portion 1428 adapted to receive, and be retained on, the distal end 13 of handle 12 of a hand tool 10 in a friction fit. In particular, the interior surface 1430 of sleeve portion 1428 is shown to include two opposed inward projections 1432 in registration with the opposed ends of the hang hole 15, such that projections 1432 nest within hang hole 15 and assist to retain the sleeve portion 1428 in position on the distal end 13 of handle 12. Of course, such retention means are not required to all embodiments; for example, in variants of a counterweight device having a sleeve portion, the interior surface thereof may be provided with a material or texture adapted to frictionally engage the distal end of the handle in a manner to be retained thereon without the use of projections or other components engaging the hang hole, and so forth.

Counterweight device 1400 is shown to include a counterweight 1412 mounted to the exterior surface thereof. As noted above, the mounting means may be permanent or detachable, and may be accomplished by any suitable means, and further may allow interchanging the counterweight with one having different mass, and so forth. Optionally, and although not shown in the drawings, a counterweight device such as device 1400 (that is, including a sleeve portion such as 1428) may include one or more counterweights 1412 supported or otherwise housed within the sleeve portion.

Example embodiments 150, 250, 1100, 1200, 1300, and 1400 of counterweight devices 1000 are shown and described above to have a laterally an or radially symmetrical weight distribution with respect to the longitudinal axis of a handle. However, this is certainly not required to all embodiments, owing to many factors such as the asymmetrical configuration of some hand tools, user preference, and so forth. Variations of the aforementioned configurations of counterweight devices to provide an asymmetrical or otherwise uneven weight distribution are possible and within the scope of this disclosure. One illustrative and very simple example of such a variation would be having counterweights 1312 of different weights mounted on the first and second ends of the post portion 1314 of counterweight device 1300 (shown in FIGS. 15-16), and so forth.

Optionally, as noted above, any of the counterweight devices discussed herein may be configured to have two or more interchangeable counterweights. Such an embodiment may be thought of as a counterweight system that includes at least one counterweight device and a set of interchangeable counterweights each having a different weight and each configured to be removably attached to either to the counterweight body of the counterweight device or to another counterweight attached thereto.

It is obvious from the foregoing description of the various inventive concepts disclosed herein, and the example implementations thereof in the several illustrative embodiments shown in the drawings, that many variations may be made to the ergonomic tool holders of the present invention without departing from the scope thereof. For example, holders may be adapted to support hand tools of many different shapes, sizes, and configurations, for example by incorporating a suitable tool support portion. Moreover, the holders described herein may be adapted for use with, or incorporated in, designs for power tools, such as drills, paint sprayers, and forth. Furthermore, the various features shown in the several illustrative embodiments may be incorporated, or not incorporated, in still other embodiments consistent with this disclosure.

Thus, although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

The invention claimed is:

1. A counterweight device for a paintbrush having a paintbrush head disposed at a forward end thereof and a paintbrush handle extending generally rearward from the paintbrush head along a longitudinal axis and terminating at a distal end, the paintbrush having a center of gravity located on the longitudinal axis forward of the midpoint between the forward and distal ends, the counterweight device comprising:
   a counterweight body configured to be selectively mounted to a portion of the paintbrush handle; and
   a first counterweight and a second counterweight supported on the counterweight body,
   wherein the counterweight device is adapted to shift the center of gravity of the paintbrush rearward along the longitudinal axis of the paintbrush to a predetermined extent when the counterweight body is mounted to the paintbrush handle,
   wherein the counterweight body includes a post portion adapted to be received in a corresponding opening formed in the paintbrush handle, the first counterweight being supported on a first end of the post portion and the second counterweight being adapted to be detachably mounted to a second end of the post portion,
   wherein the opening is a hang hole disposed proximate the distal end of the paintbrush handle and extends through the paintbrush handle, and
   wherein the post portion is adapted to extend through the hang hole.

2. The counterweight device of claim 1, wherein the exterior surface of the post portion is configured to engage the interior surface of the hang hole in a friction fit.

3. The counterweight device of claim 2, wherein the exterior surface of the post portion is at least partially ribbed.

4. The counterweight device of claim 1,
   wherein the opening is formed at the distal end of the paintbrush handle and extends into the paintbrush handle along the longitudinal axis thereof, and
   wherein at least the second end of the post portion is received in the opening in a friction fit.

5. The counterweight device of claim 4,
   wherein the second end of the post portion is threaded, and
   wherein the opening is adapted to receive the second end of the post portion in a rotational interference fit.

6. The counterweight device of claim 4,
   wherein the first end of the post portion extends from the opening, and
   wherein the first counterweight is supported on the first end of the post portion.

7. The counterweight device of claim 4, wherein the counterweight device is adapted to fit substantially entirely within the opening.

8. The counterweight device of claim 7, wherein one or more of the first counterweight and the second counterweight is integral with the post portion.

9. The counterweight device of claim 1, wherein the first counterweight is detachably supported on the counterweight body.

10. The counterweight device of claim 1, further comprising one or more additional counterweights, wherein the one or more additional counterweights are of different weights relative to the first counterweight and the second counterweight and are interchangeable with one or more of the first counterweight and the second counterweight.

11. A counterweight device for a hand tool having a forward working end and a handle extending generally rearward from the working end along a longitudinal axis and terminating at a distal end, the hand tool having a center of gravity located on the longitudinal axis forward of the midpoint between the working and distal ends, the counterweight device comprising:
   an elongate post portion having first and second ends and a textured section disposed therebetween, the textured section being adapted to extend through and frictionally engage the interior surface of a hang hole formed proximate to the distal end of the handle, with the first and second ends protruding from the hang hole when the textured section is so engaged;
   a first counterweight disposed on the first end of the post portion; and
   a second counterweight adapted to be detachably mounted on the second end of the post portion;

wherein the first and second counterweights are of equal weight; and wherein the weight of the counterweight device, when the post portion engages the hang hole and the second counterweight is mounted on the second end thereof, is adapted to shift the center of gravity of the hand tool rearward along the longitudinal axis thereof to a predetermined extent.

* * * * *